FIG. 1A

M - 0

| | 0 | 1 | 2 | 3 | 4 | 5 | 6 | 7 |
|---|---|---|---|---|---|---|---|---|
| 0 | C | C | C | C | C | C | C | 0/0-7 |
| 1 | C | C | C | C | C | C | C | 0/0-7 |
| 2 | C | C | C | C | C | C | C | 0/0-7 |
| 3 | C | C | C | C | C | C | C | 3/1-14 |
| 4 | C | C | C | C | C | B | C | 3/1-14 |
| 5 | C | C | C | C | C | C | C | 3/1-14 |
| 6 | C | C | C | C | C | C | C | 6/5-12 |
| 7 | I | C | C | C | C | C | C | 6/5-12 |
| 8 | C | C | C | C | C | C | C | 6/5-12 |
| 9 | C | C | C | C | C | C | C | 9/6-12 |
| 10 | C | C | C | C | C | C | C | 9/6-12 |
| 11 | C | C | C | C | C | C | C | 9/6-12 |
| 12 | C | C | C | IB | C | C | C | 12/9-4 |
| 13 | C | C | C | C | C | C | C | 12/9-4 |
| 14 | C | B | C | C | C | C | C | 12/9-4 |
| 15 | | C | | | A | C | | |
| 16 | | | | | | | | |
| 17 | | | | | | | | |
| 18 | | | | | | | | |
| 19 | | | | | | | | |
| 20 | | | | | | | | |

FIG. 1B

M - 1

| | 0* | 1* | 2* | 3* | 4* | 5* | 6* | 7* |
|---|---|---|---|---|---|---|---|---|
| 0 | C | C | C | C | C | C | 0-7 | A |
| 1 | C | C | C | C | C | C | 0-7 | A |
| 2 | C | C | C | C | C | C | 0-7 | A |
| 3 | C | C | C | C | C | C | 1-14 | A |
| 4 | C | C | C | C | I | C | 1-14 | A |
| 5 | C | C | C | C | C | C | 1-14 | A |
| 6 | C | C | C | C | C | C | 5-12 | A |
| 7 | B | C | C | C | C | C | 5-12 | A |
| 8 | C | C | C | C | C | C | 5-12 | A |
| 9 | C | C | C | C | C | C | 6-12 | A |
| 10 | C | C | C | C | C | C | 6-12 | A |
| 11 | C | C | C | C | C | C | 6-12 | A |
| 12 | C | C | C | B | C | C | 9-4 | A |
| 13 | C | C | C | C | C | C | 9-4 | A |
| 14 | I | C | C | C | C | C | 9-4 | A |
| 15 | C | A | | C | | A | | |
| 16 | | | | | | | | |
| 17 | | | | | | | | |
| 18 | | | | | | | | |
| 19 | | | | | | | | |
| 20 | | | | | | | | |

INVENTORS
WILLIAM L. DUDA
ERHARD MAX

BY Sughrue, Rothwell, Mion, Zinn & Macpeak
ATTORNEYS

ERROR CONTROL FOR MEMORY 3,501,748

ERROR CONTROL FOR MEMORY

William L. Duda, Wappingers Falls, N.Y., and Erhard Max, Baden, Wurttemberg, Germany, assignors to International Business Machines Corporation, Armonk, N.Y., a corporation of New York Filed Feb. 17, 1967, Ser. No. 616,845
Int. Cl. G06f *1/00*
U.S. Cl. 340—172.5 18 Claims

ABSTRACT OF THE DISCLOSURE

The storage of information words, the arrangement of information words and the readout of information words in read only memories of such large capacity that the probability of obtaining an error free store is negligibly small. The original information to be stored is arranged in lists of words and each list is successively stored in successive sections of the memory. After writing each list into its section, the stored list is read out and the erroneous words noted. The next list is stored with check words in word locations corresponding to the word locations containing errors. The erroneous words noted are arranged in a list and stored correctly and redundantly in a first additional section. In a second additional section each word stored therein contains the address of an erroneously stored word and the address with the first additional section wherein the word is written correctly. All words in the latter section are also written redundantly to increase the probability that any given word is written correctly at least once. To readout any information responsive to a given address, the addressed word and the word in the corresponding word location of the next succeeding section are interrogated and noted. If neither interrogated word is a check word, the addressed word readout was correctly written into memory and the readout process ends. However, if one of the interrogated words is a check word, meaning that the word at the addressed location was written into the memory incorrectly, the desired word must be obtained from somewhere in the first additional section. To accomplish the latter function, the second additional section is scanned for a word containing an address corresponding to the address of the desired word. When correspondence between addresses occurs the word in the second additional section is readout and the address witihn the first additional section wherein the desired word is correctly stored is noted. The latter address is used to locate the desired word within the first additional section.

CROSS REFERENCES TO RELATED APPLICATIONS

The following applications, assigned to the assignee of the present application, are cited here because of their teachings with regard to Lippmann film memories: Application Ser. No. 517,571, Wave Energy Recording In Radiation Sensitive Medium, by Rodman S. Schoals and Glenn T. Sincerbox, filed Dec. 30, 1965; Application Ser. No. 332,755, Optically Accessible Memory, by Harold Fleisher, Thomas J. Harris and Eugene Shapiro, filed Dec. 23, 1963.

BACKGROUND OF THE INVENTION

The invention relates to the formation of a reliable storage of information in an environment in which parts of the original information to be stored are incorrectly written into the storage medium.

Storage and retrieval of information, referred to as data, is of the utmost importance in data processing and computational systems. Many types of storage systems are known in the prior art and numerous systems for retrieving the data located in specified positions of the storage medium are also known. The latter mentioned systems respond to an address to readout data located at that address in storage. The computer or data processor then operates upon the data which is readout.

Reliability of the entire processing system depends in the first instance upon the correctness of the data located in storage. Consequently in filling the storage medium with data it is necessary to take precautions to insure that the original data to be placed in storage is correctly written into the storage medium.

Storage mediums in general may be divided into two types; read/write memories and read only memories. In the former type, the discovery of erroneously written information in a memory location can be corrected by merely rewriting the information correctly into that location thereby destroying the erroneous information during the process. Magnetic tape is a common example of the read/write memory.

In read only memories, once any data is written into the memory incorrectly, it cannot be replaced by the correct data which belongs in the location. A common example of a read only memory is a punched tape. Newer types of read only memories have capabilities of storing billions of words and thus the probabilities of an error free write-in to such a memory is so small that for all practical purposes it may be said that it is impossible.

The present invention relates to a reliable storage of information in memories and includes the method of storing the original information, the arrangement of the data in the memory, and the method of retrieving the desired data from the memory. The invention has particular application to read only memories because it overcomes the problems mentioned in the above paragraph.

Throughout the remainder of the specification a specific embodiment of the invention will be discussed in conjunction with only one type of read only memory. The memory is referred to as Lippmann Film.

A discussion of Lippmann Film memories and methods and apparatus for storing and reading out data into and from the memories is contained in the applications which are cross-referenced above.

In brief, it should be noted that Lippmann Film memories are optical read-only memories. A bit of information is stored in the film by creating a standing wave pattern at a spot (known as a cell or memory location) on the film and developing the film. When light is directed to the aforesaid spot, light will be reflected therefrom having a wavelengh corresponding to the recorded standing wavelength. One of the particular features of Lippmann Film memories which allows an increase in storage density even over other optical memories, is that many different bits of information may be stored in a single spot or cell. The latter is accomplised by creating plural standing wave patterns in the film, each having a different wavelength, and then developing the film. By directing light, including all possible recorded wavelengths, at the cell reflection will occur for the light wavelengths corresponding to the recorded wavelengths.

As an example of the information storage capabilities of Lippmann Film, assume each cell in the memory is to have a possibility of four bits. The first bit is assigned the color red and is stored in a cell by creating a standing wave pattern corresponding to the red wavelength. The second, third and fourth bits are assigned blue, yellow and green, respectively. White light, which contains all of the above colors is directed at the spot and the reflected light is directed to a plurality of spaced optical detectors via a color separating prism. Thus, a cell having only blue and green stored therein contains the information 0101, whereas a cell having only red and green contains the information 1001.

In the above paragraph, four colors (four bits) per cell is given as an example, but many more are possible.

In the discussion to follow it will be assumed that one word is stored in each cell, but it is apparent that since the number of bits per word is arbitrary, a cell may store more than one word or a word may be stored in more than one cell. The term cell merely means a predetermined number of bit positions in a memory. In reference to a Lippmann Film memory, the cell is a spot on the film since the predetermined number of bit positions are in a single spot.

FIGURES 1A and 1B illustrate the layout of data in the memory in accordance with an aspect of the invention.

Figure 2:
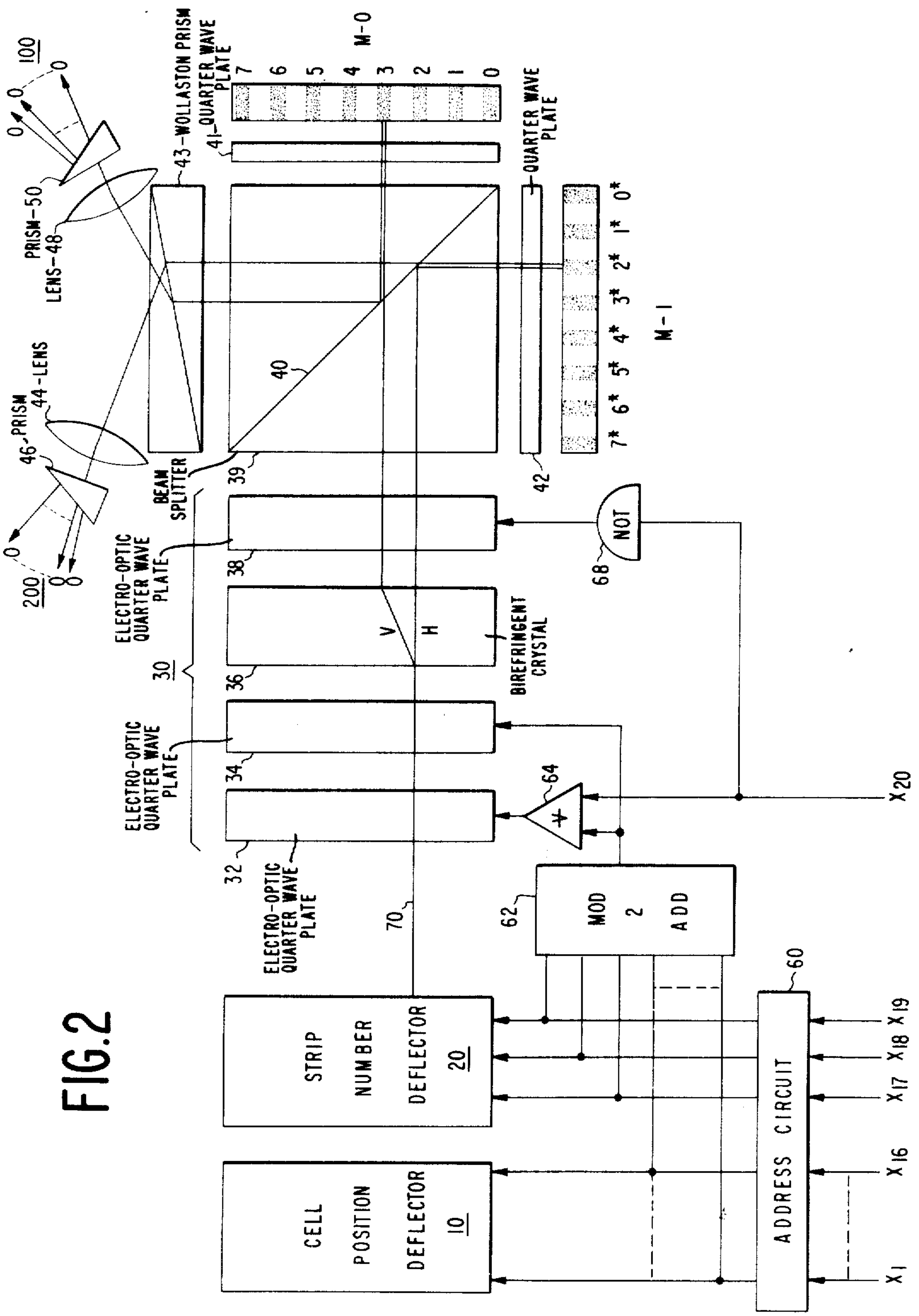
FIGURE 2 shows a block diagram of an optical apparatus useful for interrogating a memory in accordance with a preferred embodiment of the invention.

FIGURES 4 through 10A, 10B, and 10C are block diagrams of a preferred embodiment of a logic circuit for reading out information from a memory in accordance with the inventive method.

The arrangement of information in the memory will now be described with reference to FIGURES 1A and 1B. The memory is divided into two halves, referred to as memory M–0 and memory M–1, and each of the halves is divided into a plurality of strips. The strip division is not physical. As shown in FIGURES 1A and 1B, memories M–0 and M–1 are divided into light strips, each strip containing twenty cell positions. In actual practice, the strips contain many more cell positions than twenty. For the purpose of explaining FIGURES 1A and 1B, it is assumed that the information to be stored in the Lippmann type film memory is arranged so that fifteen words are to be stored in each strip. The words to be stored are arranged in lists of fifteen words each. Each full list will be stored in a separate strip.

The first list of words are written into cells 0 through 14 of strip 0 memory M–0. The formation stored therein is then readout to determine if there was any error in storage. Referring to FIGURE 1A, the letter C in any cell position means that the word was written correctly, the letter I means that the word was written incorrectly, but there is color in that cell position, the letter B means that the cell position is blank, the letter A means that only a single color is stored in the indicated cell position. Looking at strip 0 of memory M–0, it is seen that all words were written correctly except for the one which was to be written in cell 7. A list of all incorrectly written words is kept by the operator.

The next list of fifteen words is to be written in cell 0* of memory M–1. However, in this case cell 7 must be left blank so as to provide a check cell for the incorrectly written bit in cell 7 of strip 0. Thus, the first seven words of the new list will be written in cells 0 through 6 of strip 0* and the last eight words will be written into cell Nos. 8 through 15 of strip 0*. Cell 7 will be left blank. Strip 0* is then readout and it is noted that the word written in cell 14 was written incorrectly and that word is then put on the operator's list of incorrectly written words.

Each strip is, through strip 6, written in the same manner as described above and the order of writing into the strips is as follows: **0, 0*, 1, 1*, 2, 2*, 3, 3*, 4, 4*, 5, 5*, 6**. Each time a word is written incorrectly into the memory, a blank is placed in the corresponding cell of the next strip to be written.

The purpose of leaving certain cells blank, is to provide a check cell during the readout operation. According to the readout system to be described hereafter, whenever any cell N is to be readout from the memory, the cell N of the next succeeding strip is also readout. If either one of the cells has no color, that means that the desired information was written into the memory incorrectly and that the readout system must look elsewhere for the desired information. For example, if it is desired to readout the information from cell 7 of strip 0, the readout mechanism would interrogate cell 7 of strip 0 and cell 7 of strip 0*. Since cell 7 of strip 0* contains no color, the readout mechanism knows that the desired information was incorrectly written into the memory and that it must look elsewhere for the desired information.

It should also be noted that the incorrect writing of a word may result in a blank. For example, strip 3 of memory $M_0$ indicates that the word to be written in cell 12 was completely blocked by some error resulting in an unwanted blank in cell 12. The IB means that the blank was not intentionally placed in the cell position. In order to correct for this type of error, it is not necessary to place a blank in strip 3* of memory M–1 because cell 12 of strip 3 itself is blank and the readout mechanism will therefore know that the information was incorrectly written. However, due to the IB in cell 12 of strip 3, steps must be taken to insure proper readout of the information from cell 12 of strip 2*. This can best be understood by assuming that the readout mechanism is addressed to readout the information from cell 12 of strip 2*. As explained above, the readout mechanism will interrogate cell 12 of strip 2* and also cell 12 of strip 3. Since cell 12 of strip 3 is blank, it will appear to the readout mechanism that the desired information was incorrectly recorded whereas, in fact, it was correctly recorded. However, in the present invention the information is treated as if it was incorrectly recorded and it is written down on the list of incorrectly recorded information to be stored someplace else. Thus, in the latter example, the readout mechanism would detect that the information was incorrectly written and would, therefore, look somewhere else for the desired information.

One further item should be noted with respect to the strips 0 through 6, referred to as the original information strips. As is apparent from the drawings, some of the strips have a longer length than others. For example, in strip 0 the last cell position used in cell position 14 whereas in strip 0* the last cell position used is position 15. This is because a blank was inserted in strip 0* whereas none was intentionally inserted in strip 0. In strip 1*, an A was written into cell position 15. As pointed out above, the letter A indicates that a single color was written into the cell position. The single color does not represent any information word but is placed in cell 15 of strip 1* to allow proper readout of the information in cell 15 of strip 1. For example, if the readout mechanism is addressed to readout information from cell position 15 in strip 1, the mechanism interrogates cell position 15 in strips 1 and 1*. If an A had not been written into strip 1*, the readout mechanism would "think" that the desired information was incorrectly written into the memory. The A's are used to prevent such an error from occurring.

After the lists of original information are completely written into the original information strips, the operator will have a list of all words that were incorrectly written into the memory along with the locations or addresses of the incorrectly written words. From the above described operation, the operator knows (1) the words which were incorrectly written and (2) the addresses where the words should have been written. The list of words is then written into strip 6* in redundant fashion. Each word is written into three successive cells of strip 6*, also leaving blanks for any cells which were incorrectly written in strip 6.

The purpose of redundantly writing the words in strip 6* is to decrease the probability that the word will not be written at all. For example, in Lippmann Film recording, the probability that any particular cell will be incorrectly written is 0.01. Thus, if the word is written three times, the probability that it will be incorrectly written all three times is $(0.01)^3$. This is, the chance that a word written three times will be incorrect all three times is one out of a million. (It should be noted that although only a relatively few words are indicated in FIGURES 1A and 1B as being written into the memories, a more practical number of words or cells for Lippmann memories would be about $10^{16}$ words per strip and, of course, there would be many strips per memory.)

After strip 6* has been written, it is readout by the operator who notes the first cell number within strip 6* in which the words have been correctly written. For example, the operator will make a new list which notes that the word which should have been written in cell 7 of strip 0 was written correctly in cell 0 of strip 6*; the word which should have been written into cell 14 of strip 1 was written correctly in cell 3 of strip 6*, etc. The new list is then recorded redundantly in strip 7, also leaving cells blank for any information recorded incorrectly in strip 6*. The words stored in the cells of strip 7 are divided into two halves. The right half of each word is the address where a word which was incorrectly written in one of the original information strips, and the left half of the word is the address of the cell number of strip 6* wherein the incorrectly written word first appears correctly. As seen in FIGURE 1B, the term 0/0–7 is a word which represents the following information: The word that was incorrectly written into strip 0 cell 7 (noted as 0–7) is correctly written into cell 0 of strip 6*.

Following the write-in of strip 7, the information is then readout to determine which of the cells of strips 7 were incorrectly written, and then strip 7* is prepared. Strip 7* merely includes a single color in all cell positions except those corresponding to incorrectly written words in strip 7.

To summarize the above write-in operation, the information to be stored in the memory is written into a first group of strips referred to as the original information strips and any information that was incorrectly written is placed into the first redundant strip. The second redundant strip includes the addresses of the incorrectly written words and the cell number address of the first redundant strip wherein the incorrectly written word is now correctly written.

As explained above, the chance of failure for any cell write-in is about one out of a hundred, and since we are talking about memories which store billions of words, there will be a large number of cells incorrectly written. The redundancy of strip 6* lowers the chances that a word will be written incorrectly to one out of one hundred million. However, even under those circumstances it is theoretically possible that a word will not be written correctly in the original information strips and also will not be written correctly in the redundant strip. Those words can be placed in an auxiliary memory of any type, and it will be apparent that the auxiliary memory will be sufficiently small so that if any error occurs in writing into the auxiliary memory, the entire auxiliary memory may be written over without great trouble and expense. Also, a read-write memory rather than just a read-only memory could be used for the auxiliary memory. The particular type of auxiliary memory to be used depends upon the desire of the user, and therefore the particular type used along with its corresponding readout mechanism form no part of the present invention.

Before describing the details of the readout method and apparatus, the following assumptions will be made only for the purpose of the following detailed description.

It is assumed that a single memory divided into two halves is used, M–0 and M–1. It is assumed that each half memory has eight strips. Thus, three bit positions are needed to identify the eight strips of either memory. It is assumed that there are $10^{16}$ cells within each strip. Thus, sixteen bit positions are necessary to identify the cell number within any particular strip.

From the above assumptions, it will be apparent that any cell within the entire memory can be addressed by a 20-bit word represented generally by the following notation:

$$X_{20}X_{19}X_{15}X_{17} \ldots X_3X_2X_1$$

wherein $X_{16}$ through $X_1$ is the cell number address, $X_{19}$ through $X_{17}$ is the strip address and $X_{20}$ is the half memory address. A "0" in position $X_{20}$ addresses memory M–0 and a "1" in position $X_{20}$ addresses memory M–1.

A preferred embodiment of the optical device for interrogating the proper cells in the memory is illustrated in FIGURE 2. The interrogating device includes a pair of digital light deflectors 10 and 20. Digital deflector 10 is the cell position deflector and deflects the light in increments along an axis which is into the paper as the device is shown in the drawing. Digital light deflector 20 is the strip number deflector and deflects light in increments along the vertical axis as shown in the drawing. Since there are eight strips per half memory, the strip number deflector must be capable of deflecting the light to eight different positions along the vertical.

The digital light deflectors are addressed by the desired cell address in a manner to be explained hereafter, and function to position a beam of light so that it is directed at the addressed cell. As noted in the explanation of the memory, given above, the interrogation system must be designed to interrogate the check cell as well as the addressed cell, and this function is served by the correlation access mechanism 30 of FIGURE 2. The correlation access mechanism 30 splits the light beam in such a manner that if a cell in strip L is addressed, one of the split beams will interrogate the cell in strip L whereas the other beam will interrogate the corresponding cell in strip L*. However, if a cell in strip L* is addressed, the correlated access mechanism 30 causes the split beam to interrogate the addressed cell in strip L* and the corresponding cell in strip L+1.

The interrogation device also includes a beam splitter 39, a pair of quarter wave plates 41 and 42 and a Wollaston prism 43. All of the individual elements described are well known in the art. For example, the beam splitter 39 is a crystal which reflects one type of linear polarization at its internal boundary and allows the perpendicular linear polarization to pass. In the interrogation device described herein, it is assumed that the beam splitter reflects horizontally polarized light and passes vertically polarized light. It is well known to those having ordinary skill in the art that the beam splitter also will split circularly polarized light at its internal boundary 40, causing it to divide into horizontally polarized light which is reflected and vertically polarized light which is passed without deflection.

Quarter wave plates, such as quarter wave plates 41 and 42, are well known in the art and function to change the polarization of light passing therethrough. Linearly polarized light will become circularly polarized, and circularly polarized light will become linearly polarized. It is also well known that if the light passes through a quarter wave plate twice, the result will be the same as if the light had passed through a one-half wave plate. For example, if horizontally polarized light passes through a quarter wave plate, it becomes circularly polarized at the output, and if that same circularly polarized light is then passed through the quarter wave plate it becomes vertically polarized.

The Wollaston prism 43 is used to direct the light which has interrogated the memories and which now contains the stored information, into separate directions. As is well known, a Wollaston prism causes lefthanded or righthanded reflection of the light beam according to the polarization state. In the drawing, it is assumed that horizontally polarized light is deflected to the right by the Wollaston prism and vertically polarized light is deflected to the left.

The light deflected to the right by the Wollaston prism, contains the information readout of memory M–0 and it is focused onto a prism 50 by means of lens 48. The colors of the light, which represent the bits of information, are split up by prism 50 and directed to memory M–0 photodetectors 100. The light deflected to the left by the Wollaston prism 43 is directed through lens 44 to prism 46 wherein the colors are separated and directed to memory M–1 photodetectors 200. Thus, photodetectors 100 and 200 receive the information from the two cells which are interrogated at any one time.

Digital light deflectors, such as those which are to be used for the cell position deflector 10 and the strip number deflector 20, are known in the prior art and discussed in an article by Kulcke, Harris, Kosanke and Max appearing in the January 1964 issue of the IBM Journal, page 64. For the example described herein, the cell position light deflector is a digital light deflector of the type described in the above article which has sixteen one-half wave electro-optic switches and sixteen birefringent crystals varying in length from one unit to sixteen units, wherein one unit is the length sufficient to deflect the light the distance between adjacent cells in the Lippmann memory. Thus, the cell position digital deflector deflects the light to $2^{16}$ different positions. For the drawing of FIGURE 2, the deflection axis is into the paper. Note also, that in FIGURE 2, memories M–0 and M–1 are placed so that the increasing cell number positions are into the paper. In other words, the figure only shows the top view of the two half memories, with the remainder of the half memories extending into the paper. The numbers 0 through 7 in memory M–0 and 0* through 7* in memory M–1 represent the strip numbers and their respective positions in the memories.

The strip number digital deflector 20 is the same type of digital light deflector as the cell position deflector 10 with the exception that it has only three one-half wave electro-optical switches and three birefringent crystals and is capable of deflecting the light to eight different positions corresponding to the eight strips in a half memory. For the drawing of FIGURE 2, the deflection axis is the vertical axis of the paper.

As explained above, the address of any desired cell can be defined by a twenty-bit word, wherein the first sixteen bits define the cell number, the next three bits define the strip number and the last bit defines the particular half memory. Addressing of the digital light deflectors can be accomplished according to binary notation by applying the lowest order bit to energize the first electro-optic switch within the digital light deflector 10 and applying the other bits of the address through individual exclusive OR gates to the other electro-optical switches respectively. The other input to each exclusive OR gate is the adjacent lower bit of the address. The bank of exclusive OR gates is shown generally by the address circuit 60 of FIGURE 2 and in itself forms no part of the present invention. The input to the address circuit 60 is the address word, with the exception of bit X–20, and the outputs of address circuit 60 are connected to the half wave electro-optic switches in the digital light deflectors. It is assumed that a binary one on an output lead energizes the half wave deflector whereas a binary zero will not energize a half wave deflector.

It is assumed for the purpose of the detailed description herein that the light input to the deflector 10 is horizontally polarized and that the birefringent crystals deflect vertically polarized light and pass horizontally polarized light without deflection. The output of the deflector will be either horizontally or vertically polarized depending upon the number of electro-optic switches energized. If an even number of electro-optic switches are energized, the output will be horizontally polarized, whereas if an odd number of electro-optic switches are energized, the output will be horizontally polarized. Thus, a parity check device, such as a modulus two adder 62, may be used to indicate whether the output from digital light deflector 20 is horizontally or vertically polarized. If an even number of electro-optic switches have been energized, an even number of inputs to the Mod 2 adder will be binary ones, and thus the output of the Mod 2 adder will be a binary zero indicating that the output of the strip number deflector and the input to the correlation access device 30 is horizontally polarized. On the other hand, if an odd number of electro-optic switches in the digital light deflectors has been energized, thereby causing a vertically polarized light output, this will be indicated by a binary one appearing at the output of the Mod 2 adder 62.

The position of the output from the digital light deflectors is such that it will interrogate the addressed cell number in the addressed strip within memory M–0 if it passes directly through the beam splitter 39 and within memory M–1 if it is reflected by the beam splitter 39. For example, as shown in FIGURE 2, the beam 70 will strike strip 2 of the memory M–0 if it is undeflected, but will strike strip 2* of memory M–1 if it is deflected only by the beam splitter 39. Also, if the beam 70 is converted into circularly polarized light, it will split at the internal boundary 40 of the beam splitter 39 and strike strip 2 of memory M–0 and strip 2* of memory M–1.

As pointed out generally above, the purpose of the correlation access mechanism 30 is to cause the beam of light to interrogate the proper two cells. The correlation access mechanism comprises three electro-optic quarter wave plates 32, 34 and 38, and a birefringent crystal 36 which has a unit separation equal to the separation of strips in a memory. Electro-optic quarter wave plates operate as normal quarter wave plates when a binary one is applied thereto and have no effect upon light passing therethrough when a binary zero is applied to the quarter wave plates. Also, the birefringent crystal 36 passes one type of linear polarization and deflects the perpendicular type of linear polarization. For the detailed example described herein, it is assumed that a birefringent crystal is used which deflects vertically polarized light as indicated by the letter V and passes horizontally polarized light. It is also well known that if circularly polarized light is applied to the birefringent crystal 36, the light will split into a vertically polarized component and a horizontally polarized component which will be deflected and undeflected respectively.

The scheme for energizing the quarter wave electro-optic switches of the correlation access mechanism 30 can be best understood by first considering the functions which the correlated access mechanism must accomplish.

It is known by the output of the Mod 2 adder whether the interrogating beam 70 is horizontally polarized or vertically polarized. It is also known that the position of the beam is such that it will interrogate the addressed cell number, determined by the address $X_{16}$ through $X_1$, within the addressed strip, determined by $X_{19}$ through $X_{17}$. If the memory which is addressed is memory M–0 then the check strip of the other memory, memory M–1, is the same as the addressed strip of memory M–0. But, on the other hand, if the addressed memory is memory M–1, then the check strip is the same strip plus one in memory M–0. To be more specific, if the addressed cell is within strip 2 of memory M–0, then the check cell is within strip 2* of memory M–1. But, if the addressed cell is within strip 2* of memory M–1, then the check cell is within strip 3 of memory M–0.

Thus, whenever the addressed cell is in memory M–0, the correlation access mechanism 30 must operate to pass beam 70 without any deflection and cause beam 70 to be circularly polarized at the output of the correlation mechanism. If the beam into the beam splitter 39 is undeflected and circularly polarized, it will interrogate the same strip within both half memories.

In order to achieve no deflection, it is necessary that the input to birefringent crystal 36 be horizontally polarized. That is accomplished by the inputs to quarter wave electro-optic switches 32 and 34. For example, if the output from the digital light deflector is horizontally polarized, the output from the Mod 2 adder will be a binary zero, causing electro-optic switch 34 to be unenergized.

Also, since $X_{20}$ will be a binary zero (indicating the address cell is in the memory M–0), the output of exclusive OR gate 64 will also be zero causing electro-optic switch 32 to be unenergized. Since electro-optic switches 32 and 34 are unenergized, the horizontally polarized beam 70 will pass directly therethrough without any change in the polarization and will pass directly through the birefringent crystal 36 without any deflection. In order to circularly polarize the beam before it enters the beam splitter 39, the output $X_{20}$ of the total address is applied as an input to a NOT circuit which is well known in the art and which provides a binary one when the input is a binary zero, or a binary zero when the input is a binary one. In the case of an addressed word beam within memory M–0, $X_{20}$ will be a binary zero and, therefore, the output of NOT gate 66 will be a binary one, causing quarter wave electro-optic switch 38 to be energized. Since electro-optic switch 38 is energized, any beam passing therethrough which is linearly polarized on the entry side, will be circularly polarized on the output side. The circularly polarized beam will be split into a horizontal component and a vertical component at the internal boundary 40 of the beam splitter 39. The horizontal component will be deflected by the internal boundary and will pass through quarter wave plate 42 and into the proper strip of memory M–1. The quarter wave plate 42 will cause the light which interrogates the cell memory M–1 to be circularly polarized, and the light reflected from the interrogated cell will include all of the colors stored therein and will also be circularly polarized in the same direction as the incoming light. This reflected light again passes through quarter wave plate 42 and becomes vertically polarized. Since the reflected light from M–1 is vertically polarized, it will pass through boundary 40 of beam splitter 39 and into Wollaston prism 43 wherein it is deflected to the left toward photodetectors 200.

When the circularly polarized light enters the beam splitter 39 and is split at boundary 40, the vertically polarized portion will pass directly through the boundary and interrogate the addressed cell within memory M–0. The quarter wave plate 41 is positioned in front of memory M–0 so as to cause the interrogating beam to be circularly polarized and the reflected beam to be horizontally polarized, whereby the reflected beam containing the information is deflected at boundary 40 and directed to the Wollaston prism 43 wherein it is then deflected to the right toward photodetectors 100.

If the addressed cell is within memory M–1, then the correlation access mechanism 30 must provide two separated beams at its output. The case of the two separated beams is shown specifically in FIGURE 2 wherein the beam 70 is illustrated as being split prior to entry into beam splitter 39. In order to split the beam within the correlation access mechanism, it is necessary that the beam entering the birefringent crystal 36 be circularly polarized, and it is also necessary that the two beams entering the beam splitter be linearly polarized perpendicular to each other.

Whenever the addressed cell is within memory M–1, $X_{20}$ will be a binary one and thus, the output of NOT gate 68 will be a binary zero, causing electro-optic switch 38 to be unenergized. Electro-optice switch 38 will, therefore, have no effect on the light passing therethrough. The binary one is also applied as one input to the exclusive OR gate 64. In order to circularly polarize the linearly polarized light output from the digital light deflector, it is necessary that one and only one of the electro-optic switches 32 and 34 is energized. If both are energized, then the input to the birefringent crystal 36 would be linearly polarized. It can be seen from the input circuitry to electro-optic switches 32 and 34, that whenever $X_{20}$ is a binary one, one and only one of the switches will be energized no matter what the output of the Mod 2 adder. For example, if the output from the digital light deflectors is horizontally polarized, and therefore the output from the Mod 2 adder is a binary zero, electro-optic switch 32 will be energized whereas electro-optic switch 34 will not be energized. If the output from the digital light deflectors is vertically polarized, causing a binary one at the output of the Mod 2 adder, then electro-optic switch 34 will be energized whereas electro-optic switch 32 will not be energized. The circularly polarized light is split into a horizontal portion which is undeflected as shown in the drawing and a vertical portion which is deflected by an amount equal to the separation of adjacent strips within the memory. The horizontally polarized light enters the beam splitter 39 and is deflected at the boundary 40. The deflected horizontally polarized light passes through quarter wave plate 42 becoming circularly polarized and interrogates the addressed cell, which is within strip 2* in the example shown. The vertically polarized light passes directly through the boundary 40 of beam splitter 39 and interrogates the check cell in memory M–0, which is within strip 3 in the given example. The outputs from the interrogated cells are applied to photodetectors 100 and 200 as described previously.

Thus, for any addressed cell within the memory system, the interrogation device of FIGURE 2 operates to interrogate the addressed cell and the proper check cell causing the information from the interrogated cell within memory M–0 to be detected by a bank of photodetectors 100 and the information from the interrogated cell within memory M–1 to be detected by a bank of photodetectors 200. Logic circuitry to be described hereafter, operates to decide if the information readout was properly stored in the memory, and also which of the interrogated cells is the addressed cell.

Figures 3, 4:
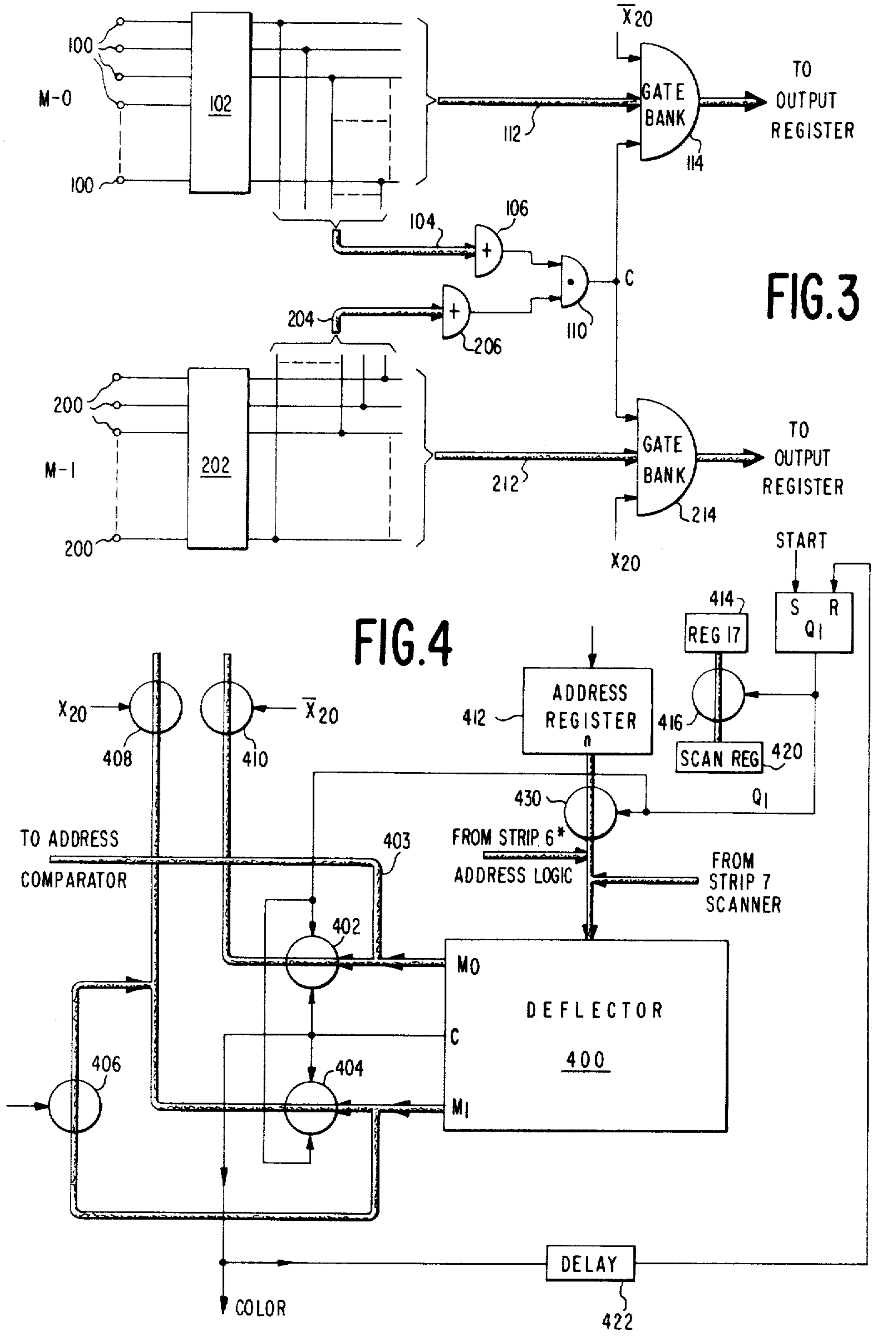
FIGURE 3 is a block diagram of a part of the memory readout apparatus.
Figure 5:
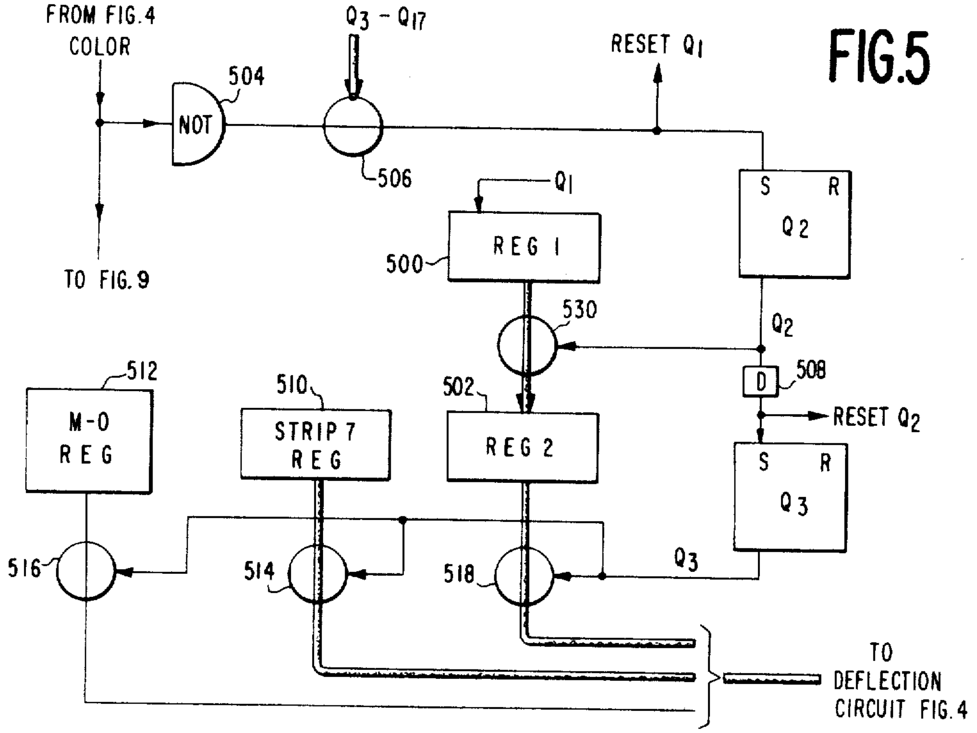
Figure 6:
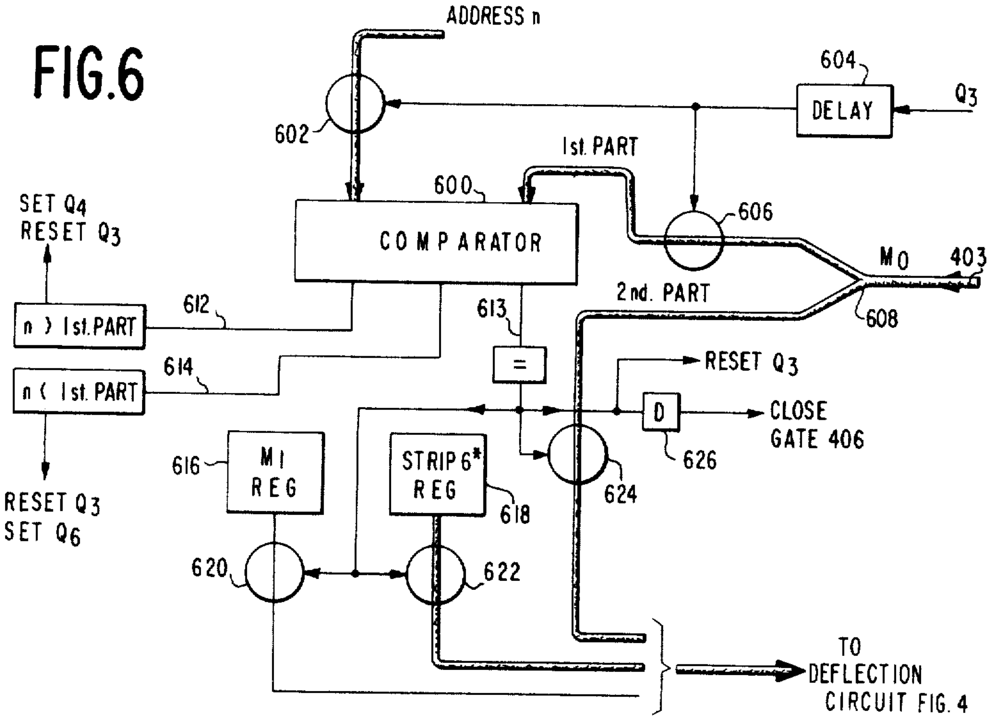

FIGURE 3 shows one example of logic circuitry for reading out the information from the interrogated cells when the addressed cell is one which was recorded correctly, i.e., both the interrogated cell and the check cell have color. Photodetectors 100 are the photodetectors which receive light from interrogated cells in memory M–0 and photodetectors 200 are the ones which receive light from interrogated cells in memory M–1. The colors detected by the photodetectors correspond to bits of information which are inserted into registers 102 and 202, respectively, the words in each register representing the information readout of the desired and check cells.

The outputs from register 102 are applied as inputs to OR gate 106 as indicated by bus line 104 and as inputs to a gate bank 114 as indicated by bus line 112. Gate bank 114 includes one gate for each bit of the memory words. The outputs from register 202 are applied as inputs to OR gate 206 as indicated by bus line 204 and as inputs to a gate bank 214 as indicated by bus line 212. Gate bank 214 is the same as gate bank 114.

The gate banks 114 and 214 will not pass the words from registers 102 and 202, respectively, to the output register unless the proper gating inputs are applied thereto. Gate bank 114 receives a gating input $\overline{X}_{20}$, indicating that the desired cell is from memory M–0 whereas gate bank 214 receives a gating input $X_{20}$, indicating that the desired cell is from memory M–1. The input $X_{20}$ is the same as the input to NOT gate 68 (FIGURE 2) and the input $\overline{X}_{20}$ is the same as the output from NOT gate 68. Since $X_{20}$ and $\overline{X}_{20}$ cannot occur simultaneously, only one of the gate banks can be gated on at any one time.

The gate banks must also receive a "1" input from AND gate 110 to be gated on. A "1" output from AND gate 110 indicates that both the desired cell and the check cell have color and, therefore, the desired cell was written correctly. Thus, a "1" output from AND gate 110 causes the information from the addressed cell to be placed in the output register.

If either the addressed cell or the check cell was blank, one of the OR gates 106, 206, will provide a "0" output, causing the AND gate output to the "0" and thereby preventing a readout of the addressed cell. Under the latter condition, the system goes to a scan of strip 7 of memory M–0 to see where in strip 6* of memory M–1 the desired information was stored.

As pointed out above, each cell in strip 7 is divided into two parts. The first part consists of twenty bits and is the address of an incorrectly written word. The second part consists of sixteen bits and is the cell number address in strip 6* where the word is correctly written. In filling strip 7, the cells are written so that the first parts are numerically in ascending order.

One possible method of locating the desired word is to begin at the top of strip 7 and readout each cell, comparing the first part with the desired address. When the first part is equal to the desired address, the corresponding second part is then used to address the deflector mechanism. It will be apparent that with $10^{16}$ cells in each strip, the task of successively reading out each cell of strip 7 becomes extremely time consuming. A better and preferred method for scanning strip 7 is referred to as the logarithmic scan method and will be described herein.

Bascially, the logarithmic scan method is carried out by starting at the middle cell of strip 7. The middle cell is interrogated and the first part is compared with the desired address (hereafter referred to as address N). If the first part in the interrogated cell is less than address N, then the scanner is moved backward halfway to the top of the strip. If the first part of interrogated word is greater than the address N, the scanner is moved forward halfway toward the end of the strip. The scanner moves in increments, referred to as major steps, until the first part of the interrogated cell is equal to the address N, or until seventeen major steps have been completed. The distance of each major step is one-half the distance of the prior major step. Remembering that in the specific example, there are $2^{16}$ cells per strip, the completion of seventeen major steps without finding an equality means that the address we are looking for is not in the main memory.

One further contingency must be taken into account during the logarithmic scan. As was pointed out above, the addresses in strip 7 may be incorrectly written and if that occurred during the write-in process, a blank would have been placed in a corresponding cell of strip 7*. Thus, in performing the logarithmic scan outlined above, it is possible that the cell of strip 7 which is interrogated will contain incorrect addresses or a check cell for strip 6*. Whenever the latter occurs, the system executes a minor step which merely shifts the scanner one cell forward. In other words, if an error is indicated in reading out the cell which is located in the middle of the strip, the scanner then moves to read out the next succeeding cell. When the next major step occurs, the scanner again moves halfway backward or forward from the original position. Referring to the specific embodiment described herein, during the logarithmic scan the scanner or interrogation apparatus is always addressed to readout a cell from strip 7 of memory M–0. Thus, the term $X_{20}X_{19}X_{18}X_{17}$ is always fixed during the log scan at 0111, and the only changes occur in the cell number address, $X_{16}X_{15}X_{14}$ - - - $X_3X_2X_1$. In order to keep track of the major steps of the logarithmic scan, a scan register is used and filled originally with the number 17. After each major step, the number in the scan register is decreased by 1.

The initial cell address is 1000000000000000 which places the scanner in the middle of the strip. If the next major step is forward, $X_{15}$ is merely inverted to give the address 1100000000000000. If, on the other hand, the major step had been backward, the address would be reached by inverting $X_{16}$ and $X_{15}$ to yield the cell address, 0100000000000000. To cover all cases, each time the scanner is moved forward a major step, the bit in $X_i$ is inverted, where $i$ is two less than the contents of the scan register. Each time the scanner is moved backward, $X_i$ and $X_j$ are inverted, where $i$ is the same as above and $j$ is one less than the contents of the scan register.

A preferred embodiment of the logic circuit which may be used to logarithmically scan strip 7 and readout the desired word from strip 6* is shown in FIGURES 4 through 9. It will be noted that in FIGURES 4 through 9, certain logical elements are shown more than once. Specifically, the scan register designated by numeral 420, the register 1 designated by numeral 500 and the register 2 designated by numeral 502 are shown more than once. The purpose is to enable one to more easily understand the logic of the apparatus and to reduce the number of cross-over lead lines which otherwise would be necessary.

The overall system begins operation when an address is placed in the address register N designated by the numeral 412 and shown in FIGURE 4. A start button sets flip-flop $Q_1$ which closes gate bank 430 allowing the contents of address register 412 to address deflector 400. The deflector 400 is the mechanism described in FIGURE 2. It is seen from the drawing, that the deflector may also be addressed by an address from the strip 7 scanner, to be explained hereafter, or by an address from the strip 6* address logic, also to be explained hereafter.

The deflector operates as described above to interrogate both the address cell and the corresponding cell in the adjacent strip. Assuming that the color is detected, and therefore the address cell contains the proper information, an output at C, indicating that color is detected, in combination with output $Q_1$ from flip-flop $Q_1$ closes gate banks 402 and 404. The contents of the interrogated cell in half memory M–0 passes through gate bank 402, and the contents of the interrogated cell in half memory M–1 passes through gate bank 404. Only one of the words will pass to the readout station due to the action of gate banks 408 and 410 and inputs $X_{20}$ and $\overline{X}_{20}$. The description of FIGURE 4 thus far describes the situation which was described in more detail above in connection with FIGURES 2 and 3.

When flip-flop $Q_1$ is set by a start impulse, the output therefrom closes gate bank 416 allowing the contents of register 414 to be inserted into scan register 420. The contents of register 414 is the binary number 17, and thus each time $Q_1$ is set, the binary number 17 will be placed in the scan register 420. The purpose of the scan register is to keep track of the number of major steps made during a logarithmic scan of strip 7.

It is assumed now that after the deflector is addressed by address N in register 412, a no-color output is detected indicating that the word which was written into the address N location, is incorrect. In binary notation, a no-color indication will be referred to as a binary zero on the C output of the deflector. A binary zero on the C output of the deflector prevents the words stored in registers 102 and 202 (FIGURE 3) from being sent to the readout station or output register. The binary zero at the C output of the deflector 400, causes a binary one to occur at the output of NOT or INVERT gate 504 (FIGURE 5) which passes through inhibit gate 506 to set flip-flop $Q_2$. The inhibit gate 506 will pass the output from NOT gate 504 unless any one of flip-flops $Q_3$ through $Q_{17}$ is in the set condition. When flip-flop $Q_2$ is set, the output therefrom closes gate bank 530 allowing the contents of register 1, designated by the numeral 500, to be inserted into register 2, designated by the numeral 502. Both registers 1 and 2 contain sixteen stages, and register 1 initially contains the binary number 1000000000000000 which is placed therein whenever $Q_1$ is initially set.

Thus, when $Q_2$ is set, the number 1000000000000000 is placed into register 2. The output from flip-flop $Q_2$ is also applied to a delay 508 whose output in turn resets flip-flop $Q_2$ and sets flip-flop $Q_3$. The delay 508 is sufficient to allow the contents of register 1 to be inserted into register 2. When $Q_3$ is set, it closes gate banks 516, 514 and 518, which allow the contents of registers 512, 510, and 502 to address the deflector 400. Registers 512 and 510 contain the address of memory M–0 and strip 7 respectively, and register 2 addresses the cell within the strip.

It will be noted that the output from NOT gate 504 which passes through inhibit gate 506, resets flip-flop $Q_1$ of FIGURE 4, and therefore during the logarithmic scan of strip 7, the contents of address register 412 will not address the deflector 400. Instead, the contents of registers 512, 510 and 502, shown in FIGURE 5, address the deflector as indicated by the bus line titled "From Strip 7 Scanner" in FIGURE 4.

The addressed cell of strip 7 and the corresponding cell of strip 7* are interrogated by the deflector mechanism 400, with the contents of the addressed cell appearing at $M_0$ and the contents of the corresponding cell of strip 7* appearing at $M_1$. The contents of the strip 7* cell are of no interest except insofar as they may determine that the address cell was incorrectly written. The latter condition will be detected if the C output of the deflector is a binary 0. For the present, it will be assumed that the C output during the logarithmic scan is a binary 1, meaning that interrogated cell of strip 7 was correctly written into the memory.

The contents of the interrogated cell of strip 7 which appears at M–0 location of the deflector 400, is in two parts. The total word which is readout from the cell is applied via bus line 403 to the comparator and strip 6* address mechanism shown in FIGURE 6. Note in FIGURE 6 the word is applied over bus line 403 and splits into its first and second parts at location 608. Splitting of the total word is merely a matter of diverting the lead lines representing the first part of the word from those lead lines which represent the second part. It will be remembered, that the first part includes twenty bits and represents an address within the original part of the memory wherein a word was incorrectly written, and the second part represents the cell number address where the word is correctly written in strip 6*. The first part is applied to a comparator 600 via gate bank 606 which is closed by a delayed output from flip-flop $Q_3$. The delay 604 is long enough to allow the deflector 400 to interrogate the proper cells. The output from 604 also closes gate bank 602 which passes address N (the original address of interest located in address register 412) to comparator 600. Comparator 600 may be any type of comparator well known in the art, which compares to binary inputs and provides three separate outputs.

The three possible conditions are that the address N is greater than the first part, in which case a binary 1 will appear on the output line 612, or the address N is less than the first part, in which case the binary 1 will appear on output line 614, or the address N is equal to the first part, in which case the binary 1 will appear on output 613. If the last condition occurs, it means that there is no need to further scan strip 7, because we have already found the address which we are looking for, and the only remaining task is to address the cell in strip 6* which corresponds to the second part of the former readout word.

A binary 1 output on lead 613 indicating that the first part is equal to address N, energizes gate banks 624, 622 and 620. Gate bank 624 passes the second part, which constitutes sixteen bits designating a cell number; gate bank 622 passes the contents of register 618, which is three bits designating strip 6*; gate 620 passes the contents of register 616, which is a single bit designating half memory M–1. The latter bits pass to the deflection circuit and address the deflector 400 as indicated by the bus line in FIGURE 4 titled "From Strip 6* Address Logic." In response thereto, the deflector mechanism interrogates the addressed cell within strip 6* and the corresponding cell within strip 7. The desired word appears at the M–1 location of deflector 400 and passes through gate bank 406 and gate bank 408 to the readout station. It will be noted that gate bank 406 will be closed due to an input which is appled from the comparator 600 of FIGURE 6 after a delay indicated by delay block 626. The output on lead 613 also resets $Q_3$ thereby preventing further logarithmic scan of the strip 7.

Referring again to FIGURE 6, assume that the address N is greater than the first part thereby causing a binary 1 output to appear on comparator output lead 612. The output on 612 means that if the desired address has been stored in strip 7 at all, it is further toward the end of the strip and it is therefore necessary to perform a major step by jumping forward halfway between the middle of the strip and the end of the strip.

Figure 8:
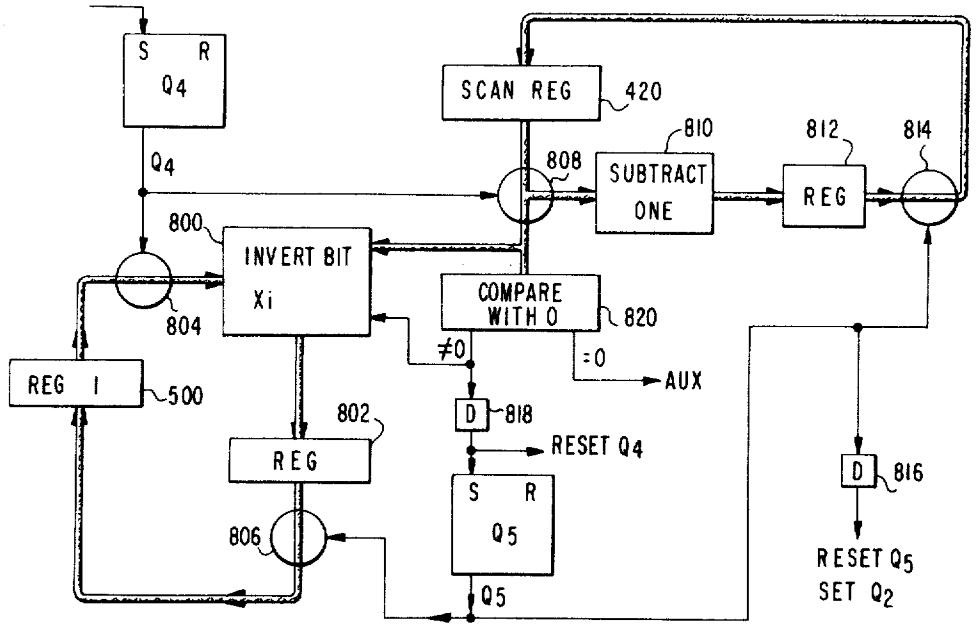

The half jump forward is accomplished by the circuitry shown in FIGURE 8. The output on lead 612 of FIGURE 6 resets $Q_3$ and sets $Q_4$, which is shown in FIGURE 8. When $Q_4$ is set, it begins the major step forward by closing gate bank 804 and gate bank 808. When gate bank 804 is closed, the contents of register 1, which in the initial stage is 1000000000000000, is sent to a logic unit 800 designated as the Invert Bit $X_i$ block. The output from the scan register 420, which contains the scan cycle number, is also applied to logic unit 800. Furthermore, a comparator circuit 820 detects whether or not the contents of the scan register 420 is equal to zero. It will be noted, that if the scan register is equal to zero, that means that seventeen major steps have already been performed and therefore the information we are looking for is not in the memory. In that case the output on the equal zero line initiates some auxiliary memory which forms no part of the present invention. In the normal case, the scan register will not have reached zero and a "not-equal zero" output will appear and energize logic unit 800. The "not-equal zero" output will also be applied to a delay block 818.

The function of the logic unit 800, when energized by a not-zero output from 820, is to pass the contents of register 1 into register 802 after inverting a single bit of the sixteen bits accepted from register 1. The particular bit which is inverted, depends upon the binary number in scan register 420 which is fed to the logic block 800. The bit inverted, designated $X_i$, is the bit which is two less than the binary number in scan register 420. For example, if scan register contains the number 17, then bit $X_{15}$ will be inverted. If scan register 420 contains the number 16, then bit $X_{14}$ will be inverted, etc. It will be noted that the contents of register 802 will subsequently be reinserted into register 1, and thus it will be apparent that the operation described above results in updating register 1 so that the sixteen bit address therein is moved halfway from its initial position to the end of strip 7. For example, at the beginning of the logarithmic scan, register 1 will contain the address 1000000000000000 corresponding to the middle cell of strip 7 and the scan register will contain the number 17. The operation of logic unit 800 and the associated logic circuitry updates register 1 so that it will contain the address 1100000000000000. If a subsequent major step forward occurs, the register 1 will be updated to contain the address 1110000000000000, etc. It should be noted that the contents of the scan register will be decreased by 1 each time a major step occurs whether the major step be forward or backward. Particular logic circuitry for performing the operation of logic unit 800 will be described hereafter in connection with FIGURES 10A through 10C.

When gate bank 808 of FIGURE 8 is closed by $Q_4$, the contents of the scan register 420 are also applied to a subtract one circuit 801 wherein the value one is subtracted from the contents of the scan register with the difference being inserted into register 812. After a delay indicated by delay block 818, $Q_4$ is reset and $Q_5$ is set. When $Q_5$ is set, the contents of register 802 passes through gate bank 806 into register 1 and also the contents of register 812 passes through gate bank 814 into the scan register 420. Thus, the result of the total logic shown in FIGURE 8 is that register 1 is updated to contain a new cell address which constitutes a major step forward, and the contents of scan register 420 is decreased by the number 1. The output $Q_5$ is then applied through a delay 816 to reset $Q_5$ and then set $Q_2$.

Referring back to FIGURE 5, it can be seen that the setting of $Q_2$ will cause the new contents of register 1 to be placed in register 2 followed by the addressing of a cell in memory M–0 and strip 7 which corresponds to the new cell number address in register 2.

When the new cell is addressed, again assuming that there is color, the detected output is once again applied to FIGURE 6 wherein it is split into a first part that is compared with address N and a second part. Whenever a comparison is made at comparator 600 one of the output leads is energized. The logic which is initiated when output lead 613 is energized has already been explained and the logic which is initiated when output lead 612 is energized has already been explained. The third case occurs when the address N is less than the first part. When that condition occurs, it is necessary to perform a major step backward by changing the contents of register 1. The latter is accomplished by the logic circuitry shown in FIGURE 7 which is energized by a binary 1 on the output lead 614 of FIGURE 6. The latter condition resets $Q_3$ and sets $Q_6$.

Figure 7:
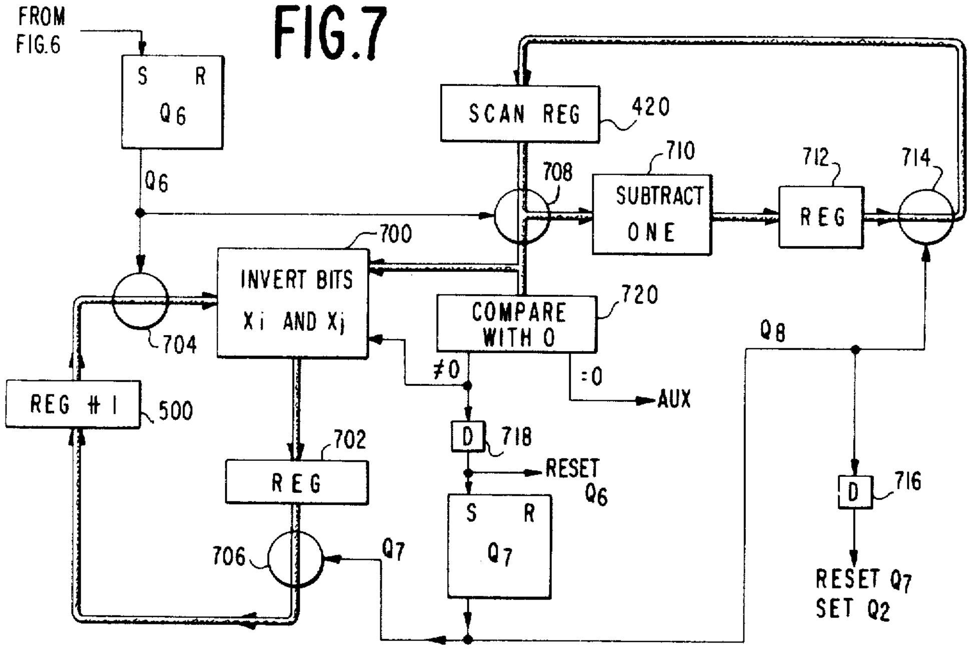

The logic circuitry for performing the major step backward, as shown in FIGURE 7 is the same as the logic for performing a major step forward in FIGURE 8, with the exception that the logic unit 700 of FIGURE 7 causes two bits of register 1 to be inverted whereas the logic unit 800 of FIGURE 8 causes one bit of the register 1 to be inverted. In logic unit 700, the bits which are inverted are those located in bit positions one less than the number in the scan register and two less than the number in the scan register. For example, if the number 17 is in scan register 420, then bits $X_{16}$ and $X_{15}$ will be inverted. If the number in the scan register is 16, then bits $X_{15}$ and $X_{14}$ will be inverted, etc. As a specific example, at the start of the logarithmic scan, the contents of register 1 will be the cell number designation 1000000000000000 and the scan register will contain the number 17. The deflection mechanism will be addressed by the circuitry shown in FIGURE 5 to readout the cell in strip 7 which is located at position 1000000000000000. Assuming that the first part of the detected information is less than the address N, the logic circuitry shown in FIGURE 7 will be initiated causing bits $X_{16}$ and $X_{15}$ of the register 1 contents to be inverted. $X_{16}$ was a binary 1 and will be changed to a binary zero; $X_{15}$ was a binary zero and will be changed to a binary 1. The new contents of register 1 will be the cell designation 0100000000000000 which designates the cell that is halfway between the middle of the strip (designated by the old contents of register 1) and the top of the strip. It will also be noted that scan register 420 will be decreased by the number 1 so that it now contains the number 16. Since the remainder of the logic shown in FIGURE 7 is identical to that shown in FIGURE 8, it will not be described further.

The logic circuitry described thus far performs a complete logarithmic scan of strip 7 to locate an address which corresponds with address N. The system will either find the equivalent address or will complete seventeen major steps without finding the desired address and then provide an indication that some auxiliary memory must be interrogated to find the desired information. The above description, however, does not take into account the situation which occurs when a cell of strip 7 is addressed and a no-color designation appears at the deflector output.

Figure 9:
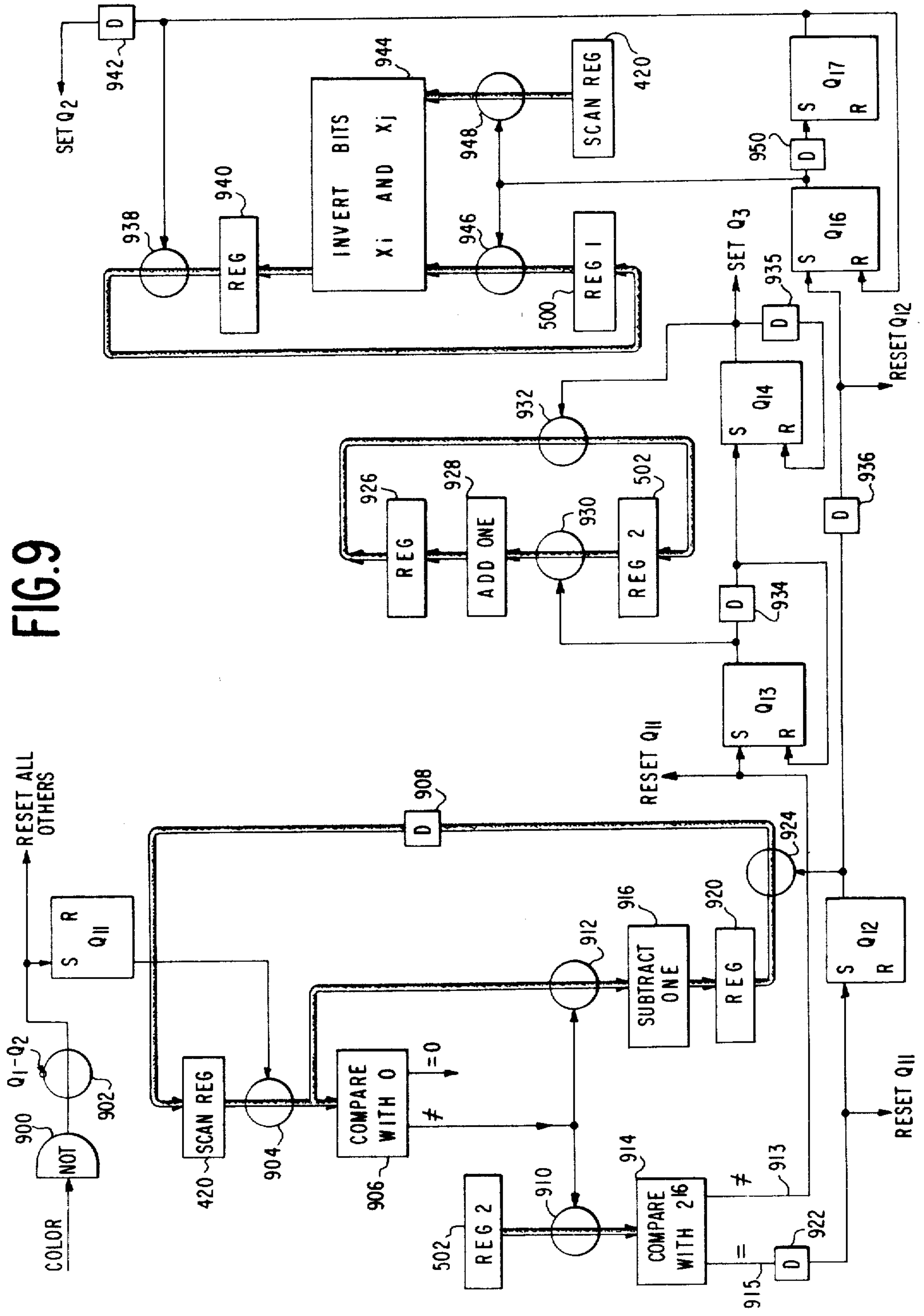

As pointed out above, a no-color designation in this instance means that the information contained in the addressed cell of strip 7 is incorrect. Also, it was pointed out above in the general description of the logarithmic scanning method that when a no-color condition occurs, the scanner merely moves to the next succeeding cell number, constituting a minor step. The logic apparatus for performing a minor step is shown in FIGURE 9. The apparatus of FIGURE 9 is energized by a binary zero on the C output of deflector 400 during the time that the log scan mechanism is in operation. The binary zero causes a binary 1 to appear at the output of NOT or INVERT gate 900 which passes through inhibit gate 902 and sets flip-flop $Q_{11}$. Inhibit gate 902 will pass the output from NOT gate 900 at all times except when either $Q_1$ or $Q_2$ is set. Thus, $Q_{11}$ is set whenever a no-color indication occurs during the addressing of a cell within strip 7. It is also indicated in FIGURE 9 that the output from inhibit gate 902 resets all other flip-flops thereby preventing the major step logic circuits of FIGURES 7 and 8 from operating. The purpose of the logic circuit shown in FIGURE 9 is first to update the cell number address in register 2 by 1 and second to perform a major step backward if register 2 is completely filled with ones. To explain the meaning of the latter statement, it will be noted that if register 2 is loaded with ones, it cannot be further updated. Furthermore, the only time that it will be loaded with ones will be when all of the cells between the position designated by register 1 and the highest number cell within the strip contain incorrect information. If the latter occurs, it is necessary to perform a major step backward and look for the desired address in another area of the strip. It will be noted that the condition of all ones in register 2 will be rare.

When $Q_{11}$ is set, gate bank 904 is closed causing the contents of scan register 420 to be compared with the value zero in comparator 906. If the scan register contains the value zero, that means that seventeen major steps have previously been performed and it is useless to go any further. An output on the equal zero lead line indicates this condition and also may be used to energize some auxiliary memory to locate the desired information therein. Under normal circumstances, the contents of the scan register will not be equal to zero and an output on the "not-zero" lead line will close gate banks 910 and 912. Gate bank 912 passes the contents of scan register 420 into the subtract one subtractor 914 whose output is one less than the contents of the scan register and is applied to register 920. Gate bank 910 passes the contents of register 2 into a comparator circuit 914 wherein it is compared with the value $2^{16}$. It will be noted that register 2 has sixteen bit positions and if all bit positions contain binary ones, the value will be $2^{16}$. Thus, comparator circuit 914 detects whether or not register 2 contains all ones. Under the most usual conditions, register 2 will not contain all ones and the comparator 914 will provide an output on lead 913. The output on lead 913 sets flip-flop $Q_{13}$ which in turn closes gate bank 930. Gate bank 930 passes the contents of register 2 into an add 1 circuit 928 wherein the number 1 is added to the contents of register 2, and the result of the addition is inserted into a register 926. The output $Q_{13}$ is also applied to a delay block 934 which is long enough to allow the contents of register 2 to be updated and inserted into register 926. The output of delay block 934 resets $Q_{13}$ and sets $Q_{14}$. When $Q_{14}$ is set, it closes gate bank 932 which passes the contents of register 926 into register 2. Thus, due to the operation of flip-flops $Q_{13}$ and $Q_{14}$, the contents of register 2 are updated by 1. The output of $Q_{14}$ also resets $Q_{14}$, after a delay which is sufficiently long to allow the contents of register 926 to be transferred to register 2, and sets $Q_3$.

The setting of flip-flop $Q_3$ (FIGURE 5) causes the address in combined registers 512 510 and 502 (register 2) to address the deflector 400. The contents of the latter registers addresses a cell within strip 7 which is only a single number higher than the previously addressed cell.

It will be noted that after a minor step is made by the circuitry of FIGURE 9 the flip-flop $Q_3$ is directly set, whereas after a major step is completed by the circuitry of FIGURE 7 or FIGURE 8, the flip-flop $Q_2$ is set. Thus, each time a major step is completed, the contents of register 1 is changed to a new value and it remains at that new value until a new major step occurs. Whenever a minor step occurs, the contents of register 1 will not be changed but the contents of register 2 will merely be updated by the number one. Thus, whenever a major step occurs after one or more minor steps has occurred, the new value in register 1 created by the major step will depend only upon the old value in register 1 and not upon the number of minor steps which have occurred in between the major steps.

Referring back to FIGURE 9, the remaining logic circuitry, not described above, performs a major step backward whenever the contents of register 2 is filled with ones. When the latter condition occurs, there will be an output from comparator 914 on lead 915 which is applied to the set input of flip-flop $Q_{12}$ via delay block 922. The ouput from delay block 922 also resets $Q_{11}$. The output from $Q_{12}$ passes through delay 936 and sets flip-flop $Q_{16}$ which closes gate banks 946 and 948. The gate bank 946 passes the contents of register 1 into logic unit 944, and gate bank 948 passes the contents of scan register 420 into logic unit 944. Logic unit 944 may be the same as logic unit 700 as shown in FIGURE 7. The logic unit 944 performs a major step backward by inverting two of the bits in register 1 in accordance with the number that is in scan register 420. The output of logic unit 944, which is the same as the contents of register 1 with two selected bits inverted, is inserted into register 940 where it is held until gate bank 938 is closed allowing the contents thereof to be inserted into register 1. The output of $Q_{16}$ passes through delay block 950 and sets $Q_{17}$. Delay block 950 is long enough to allow the inversion of the selected bits of register 1 in the placing of the output of logic unit 944 into register 940. The output of $Q_{17}$ resets $Q_{16}$ and turns on gate bank 938. The output from $Q_{17}$ also passes through delay block 914 and sets $Q_2$. Delay block 942 is long enough to allow the contents of register 940 to be placed in register 1.

The output from $Q_{12}$ also closes gate bank 924 which passes the contents of register 920 into scan register 420 via delay block 908. The complete loop which includes scan register 420, gate banks 904, 912 and 924, subtract circuit 916, register circuit 920 and delay block 908, performs the required down rating of the scan register contents whenever a major step is initiated. The delay block 908 prevents the scan register contents from being downgraded until after the logic unit 944 has completed its operation.

The above described logic apparatus shown in FIGURES 4 through 9 is one specific embodiment of a logic circuit which will logarithmically scan strip 7 and either find where the desired information is stored in strip 6* or detect that the desred information is not in the main memory at all. All of the individual logic blocks shown in the drawings are old and well known in the art. Also, any logic circuit for performing the desired functions of units 700, 800 and 944 may be used. A particular form of such logic units is shown in FIGURES 10A through 10C.

Figures 10A, 10B, 10C:
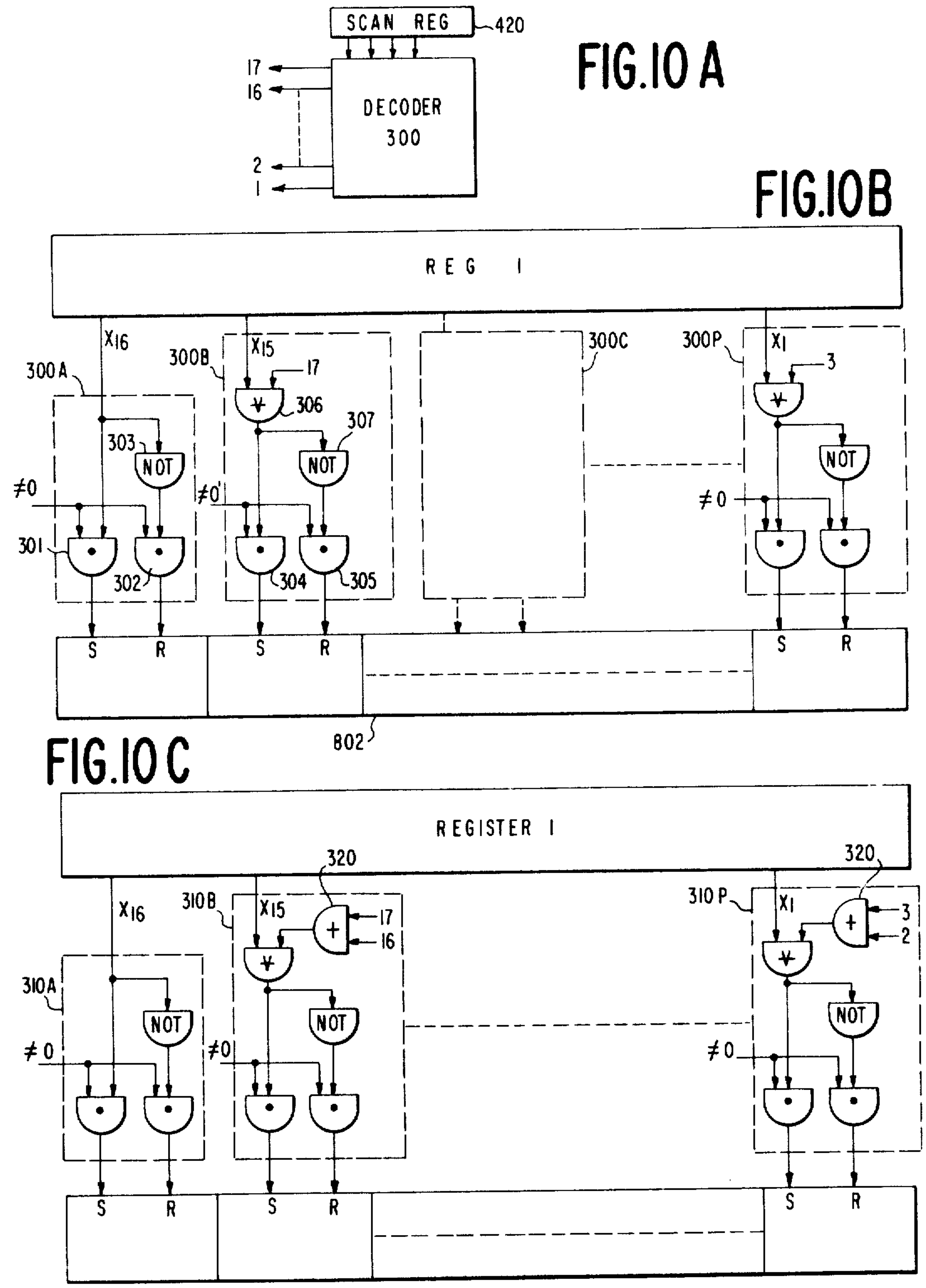

FIGURE 10A shows generally a decoder 300 having inputs applied from the stages of scan register 420. The decoder provides seventeen outputs, only one being energized at any given time. The particular output line which is energized corresponds to the binary number in scan register 420. Decoders for performing the operation of converting a binary number input into one out of N outputs, where N is the capacity of the binary register, are old and well known in the art. The outputs 1 through 17 are used to gate different ones of the bits in register 1 so that they will be inverted.

Each of the logic units 700, 800 and 944, comprises sixteen individual gating circuits. Each gating circuit passes one bit from register 1 to a corresponding stage of the output register of the logic unit. If the particular gating circuit is energized by one of the outputs from decoder 300, then the bit from register 1 associated with that gating circuit is inverted before beng applied to the corresponding stage of the output register. For register 800, each decoder output is applied to a single gating circuit. The gating circuit to which any particular decoder output is applied is the one having an input from the $X_i$ stage of register 1. As explained above, $i$ is two less than the sum in the scan register. For example, output 17 is applied to the gating circuit which also receives the output from stage $X_{15}$. Output 16 is applied to the gating circuit which receives the output from stage $X_{14}$ of register 1, etc.

One example of the logic unit 800 is shown in FIGURE 10B. The contents of the sixteen stages of register 1 are transferred to the corresponding stages, respectively, of register 802 via sixteen different gating circuits 300A through 300P. All the gating circuits with the exception of 300A are identical and operate to transmit a bit unchanged from a stage of register 1 to a corresponding stage of register 802, or when a gating input is applied from decoder 300, invert a bit in register 1 and apply it to a corresponding stage of register 802. The reason why gating circuitry 300 is different is because the highest order bit in register 1, $X_{16}$, is never inverted, and therefore the logic necessary to invert the bit in stage $X_{16}$ of register 1 is unnecessary.

Gating circuit 300A includes a pair of AND gates and a single NOT or INVERT gate. The AND gates are gated on by a "not-equal zero" input which is applied to the circuit from the comparator 820 (FIGURE 8). If the bit in $X_{16}$ is a binary 1, then AND gate 301 will be fully energized causing a binary 1 to be applied to the set input of the $X_{16}$ stage of register 802. If on the other hand, $X_{16}$ of register 1 contains a binary zero, AND gate 302 will be fully energized. Applying a binary 1 to the reset input of stage $X_{16}$ of the register causes a binary 0 to be stored therein.

Since gating circuits 300B through 300P are identical, only one will be described herein. Gating circuitry 300B contains AND gates 304 and 305, NOT or INVERT gate 307, and exclusive OR gate 306. In the absence of an input from the decoder 300, which for circuit 300B is input 17, the circuit acts identical to circuit 300A. $X_{15}$ is applied unchanged through the exclusive OR gate 306 to AND 304 and to AND gate 305 via NOT gate 307. A "not-equal zero" input gates on AND gates 304 and 305, and depending upon whether $X_{15}$ is a binary 0 or binary 1, one of the AND gates will provide an output to register 802. When an input 17 is applied to exclusive OR gate 306, the input $X_{15}$ is effectively inverted before being applied to the remainder of the circuit. The result is that the corresponding stage of register 802 stores the opposite bit that which is in register 1.

An example of the logic unit 700 (FIGURE 7) is illustrated in FIGURE 10C and differs from logic unit 800 in that each gating circuit, except the first one, includes an additional OR gate. The reason for the OR gate, is to cause inversion of selected bits in response to any one of two possible inputs from decoder 300. Gating circuit 310A is the same as gating circuit 300A of FIGURE 10B. Gating circuits 310B through 310P are identical and differ from gating circuits 300B through 300P only by their inclusion of an OR gate 320. The OR gate 320, in gating circuit 310B, serves to invert $X_{15}$ if an input is applied at either 17 or 16.

The logic unit 944, shown in FIGURE 9, performs the same function as logic unit 700, shown in FIGURE 7. The only difference is that in FIGURE 9, the logic unit 944 does not receive an input from any compare with zero circuit. The latter could easily be accomplished by applying an output from comparator 906 to the logic unit 944. On the other hand, the AND gates and the gating circuits 310A through 310B could be removed, thereby eliminating the need for a not equal zero input.

While the invention has been particularly shown and described with reference to preferred embodiments thereof, it will be understood by those in the art that the foregoing and other changes in form and details may be made therein without departing from the spirit and scope of the invention.

What is claimed is:

1. A method of writing digital information words into a read only memory comprising the steps (a) writing a plurality of lists of digital words into said memory, each list being stored in a separate section of said memory and said lists being written sequentially, (b) reading out each list after writing it into a section and recording the address of each word incorrectly written and the word itself, (c) writing check words into a said section during the writing of a list into said section, said check words being written into word positions corresponding to the positions of incorrectly written words in the previously written list, (d) writing all of said words, which were incorrectly written into a first new section of said memory, said first new section being other than said prior mentioned sections, and (e) writing into a second new section the address of each word correctly written into said first new section along with the address where the word was incorrectly written, said second new section being other than said prior mentioned sections.

2. The method as claimed in claim 1 wherein the words to be written into said first new section are written redundantly and check words are written into said first new section at word positions corresponding to word positions of incorrectly written words in the previously written section.

3. The method as claimed in claim 2 wherein all words except said check words include an identifiable characteristic which distinguishes them from said check words.

4. The method as claimed in claim 3 wherein said addresses written into said second new section are written redundantly.

5. The method as claimed in claim 4 further comprising the step of writing check words into a third new section in word positions corresponding to incorrectly written information in said second new section and writing other digital bits into the remaining locations of said third new section.

6. The method as claimed in claim 5 wherein said memory is a Lippmann film memory, said sections are strips in the memory, and said word positions are cells.

7. The method as claimed in claim 6 wherein said distinguishing characteristic of all words other than said check words is a color recorded in a selected bit position of the cell and wherein the step of writing check words comprises recording no colors into cell numbers of any given strip which correspond to cell number of the previously recorded strip which contain incorrect information.

8. A read only memory comprising (a) a first plurality of memory section means for storing original information and error check information, each of said memory section means comprising a plurality of word storage location means for storing a list of information words and check words, said check words being stored in word storage location means which correspond to a word storage location means of a preceding one of said memory section means in which erroneous information words are stored, each of said information words containing a characteristic which distinguishes it from said check words, (b) a first additional memory section means, having a plurality of word storage location means, for storing correct information words corresponding to said erroneous information words contained in said first plurality of memory section means, and (c) a second additional memory section means, having a plurality of word storage location means, for storing the address of each said erroneous information word stored in said first plurality of memory section means and the address in said first additional section means wherein said word is correctly stored.

9. The memory as claimed in claim 8 wherein said first additional section means further comprises word storage location means for storing check words, said latter word storage location means corresponding to the word storage locations of the last section means of said first plurality of memory section means which contain erroneous information words.

10. The memory as claimed in claim 9 wherein the information words contained in said first additional section means are contained redundantly in more than one word location means.

11. The memory as claimed in claim 10 wherein the addresses contained in said second additional section means are contained redundantly in more than one word location means each.

12. The memory as claimed in claim 11 wherein the memory is a Lippmann film and said distinguishing characteristic is a single preselected color representing a "1" bit in a preselected bit position.

13. The memory as claimed in claim 12 further comprising a third additional section means for storing check words in word locations corresponding to erroneously stored information in the second additional section means and data different from check words contained in the other word locations.

14. A method for obtaining correct information words, identified by memory addresses, from a sectional memory comprising the step of (a) reading out the word in memory located at a given address, (b) reading out a word in memory located at a position in memory which differs from said address only by the section of said memory, (c) comparing both said above-mentioned words with a predetermined check word, and (d) presenting said first mentioned word in an output register if neither of said words is the same as said predetermined check word.

15. The method as claimed in claim 14 further comprising the steps of reading out the desired word from a certain location in a first special section of said memory when either of said readout words is the same as a predetermined check word.

16. The method as claimed in claim 15 wherein the last mentioned step comprises (a) scanning a second special section in said memory for an address corresponding to said given address, (b) reading out from said second special section a "certain location" address which is associated with said corresponding address, and (c) reading out the word which is at a location in said first special section identified by said "certain location" address.

17. A method for reading out an information word identified by its address from a memory, said memory arranged as follows:

the memory comprises a plurality of ordered sections each of which stores a list of original information and also check words if any information words in the preceding memory is stored incorrectly, the check words in a given section are located in word locations corresponding to word locations of the preceding section which contain incorrect information; the memory also comprises a first additional section in which are stored all information incorrectly stored in the other part of the memory, the words are stored redundantly in the first additional section and also check words appear therein as in all other sections; a second additional section contains two part words wherein the first part is the address of a word incorrectly stored in the plurality of sections and the second part is the address of the latter mentioned word within the first additional section where it is correctly stored, and a third additional section which contains check words for each incorrect word in the second additional section; the method for reading out from said memory comprising the steps of (a) reading out an addressed word from the addressed location and a word located in a corresponding location of the next adjacent memory section, (b) comparing both said latter mentioned words with a predetermined check word, (c) passing said addressed word to an output station if neither of said words is the same as said check word, (d) scanning said second additional section for the first part of a word which corresponds to the address of said addressed word, and (e) reading out a word location in said first additional section having a location identified by the second part of a word in said second additional section which has a first part that corresponds to said address, the latter two steps being carried out only if one of the original two words read out of the memory is a check word.

18. The method as claimed in claim 17 wherein the step of scanning said second additional section comprises (a) reading out the words of said second additional section along with words from corresponding locations of said first location in accordance with the following scheme:

if a check word is read out, move to the next adjacent word location, if no check word is read out and the first part of the word from the second additional section is greater than the original address move backward a given number of word locations wherein said given number of word locations decreases by one-half after each readout that does not produce a check word, if no check word is read out and the first part of the word from the second additional section is less than the original address move forward said given number of word locations, if no check word is read out and the first part of the word from the second additional section is equal to the original address, stop the scan of said second additional strip.

References Cited

UNITED STATES PATENTS

| | | | |
|---|---|---|---|
| 3,245,049 | 4/1966 | Sakalay __________ | 340—172.5 |
| 3,296,594 | 1/1967 | Van Heerden ______ | 340—172.5 |
| 3,336,579 | 8/1967 | Heymann _________ | 340—172.5 |
| 3,350,690 | 10/1967 | Rice _____________ | 340—172.5 |
| 3,351,905 | 11/1967 | Kramer __________ | 340—146.1 |

PAUL J. HENON, Primary Examiner

R. F. CHAPURAN, Assistant Examiner